(12) United States Patent
Wang et al.

(10) Patent No.: US 11,876,275 B2
(45) Date of Patent: Jan. 16, 2024

(54) LIQUID CRYSTAL PHASE SHIFTER, METHOD FOR OPERATING THE SAME, LIQUID CRYSTAL ANTENNA, AND COMMUNICATION APPARATUS

(71) Applicants: BEIJING BOE SENSOR TECHNOLOGY CO., LTD., Beijing (CN); BOE TECHNOLOGY GROUP CO., LTD., Beijing (CN)

(72) Inventors: Ying Wang, Beijing (CN); Tienlun Ting, Beijing (CN); Jie Wu, Beijing (CN); Xue Cao, Beijing (CN); Liang Li, Beijing (CN); Haocheng Jia, Beijing (CN); Peizhi Cai, Beijing (CN); Chuncheng Che, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/990,001

(22) Filed: Nov. 18, 2022

(65) Prior Publication Data
US 2023/0079873 A1    Mar. 16, 2023

Related U.S. Application Data

(63) Continuation of application No. 16/641,444, filed as application No. PCT/CN2019/099798 on Aug. 8, 2019, now Pat. No. 11,563,260.

(30) Foreign Application Priority Data

Aug. 10, 2018   (CN) .......................... 201810910040.8

(51) Int. Cl.
*H01P 1/18*          (2006.01)
*H01Q 3/38*          (2006.01)

(52) U.S. Cl.
CPC ............... *H01P 1/181* (2013.01); *H01Q 3/38* (2013.01)

(58) Field of Classification Search
CPC ................................. H01P 1/181; H01P 1/184
See application file for complete search history.

(56) References Cited

U.S. PATENT DOCUMENTS

| | | | |
|---|---|---|---|
| 6,646,522 | B1 | 11/2003 | Kozyrev et al. |
| 6,842,148 | B2 | 1/2005 | Hendler et al. |

(Continued)

FOREIGN PATENT DOCUMENTS

| | | |
|---|---|---|
| CN | 106450765 A | 2/2017 |
| CN | 106532200 A | 3/2017 |

(Continued)

OTHER PUBLICATIONS

Notice of Allowance dated Sep. 20, 2022 corresponding to U.S. Appl. No. 16/641,444.

(Continued)

*Primary Examiner* — Daniel Munoz
(74) *Attorney, Agent, or Firm* — Nath, Goldberg & Meyer; Joshua B. Goldberg (57) ABSTRACT

A liquid crystal phase shifter, a liquid crystal antenna, a communication apparatus, and a method for operating a liquid crystal phase shifter are provided. The liquid crystal phase shifter includes a microwave transmission structure and a phase adjustment structure opposite to each other, and a liquid crystal layer between the microwave transmission structure and the phase adjustment structure; wherein the phase adjustment structure comprises a plurality of phase adjustment units; the plurality of phase adjustment units are configured to change a dielectric constant of the liquid crystal layer according to a voltage applied to the phase adjustment units and a voltage applied to the microwave (Continued)

transmission structure, so as to adjust a phase of a microwave signal; and phase shift amounts adjusted by at least two of the plurality of phase adjustment units are different from each other.

20 Claims, 5 Drawing Sheets

(56) References Cited

U.S. PATENT DOCUMENTS

| | | | |
|---|---|---|---|
| 11,563,260 B2* | 1/2023 | Wang | H01P 1/184 |
| 2003/0146806 A1 | 8/2003 | Nuecther et al. | |
| 2015/0380789 A1 | 12/2015 | Jakoby et al. | |
| 2019/0131719 A1* | 5/2019 | Haziza | H01Q 21/0037 |

FOREIGN PATENT DOCUMENTS

| | | |
|---|---|---|
| CN | 106684551 A | 5/2017 |
| CN | 106773338 A | 5/2017 |
| CN | 208654481 U | 3/2019 |
| EP | 2768072 A1 | 8/2014 |
| JP | H11103201 A | 4/1999 |
| JP | 2003298306 A | 10/2003 |

OTHER PUBLICATIONS

Extended European Search Report dated Apr. 11, 2022 for application No. EP19847245.8.

Anne-Laure Franc, et al.; "Compact and Broadband Millimeter-Wave Electrically Tunable Phase Shifter Combining Slow-Wave Effect With Liquid Crystal Technology"; IEEE Transactions on Microwave Theory and Techniques, vol. 61, No. 11, Nov. 2013.

Non-Final Office Action dated Jun. 7, 2022 corresponding to U.S. Appl. No. 16/641,444.

Indian First Office Action dated Apr. 26, 2021 corresponding to application No. 202047022629.

International Search Report dated Oct. 31, 2019 corresponding to application No. PCT/CN2019/099798.

* cited by examiner

LIQUID CRYSTAL PHASE SHIFTER, METHOD FOR OPERATING THE SAME, LIQUID CRYSTAL ANTENNA, AND COMMUNICATION APPARATUS

CROSS REFERENCE TO RELATED APPLICATIONS

This is a Continuation of U.S. patent application Ser. No. 16/641,444, filed Feb. 24, 2020, a National Phase application filed under 35 U.S.C. 371 as a national stage of PCT/CN2019/099798, filed on Aug. 8, 2019, an application claiming priority to Chinese patent application No. 201810910040.8, filed on Aug. 10, 2018, the entire contents of each of which are incorporated herein by reference.

TECHNICAL FIELD

The present disclosure relates to the field of communication technologies, and in particular, to a liquid crystal phase shifter, a liquid crystal antenna, a communication apparatus, and a method for operating a liquid crystal phase shifter.

BACKGROUND

A phase shifter is a device that may change a phase of an electromagnetic wave signal. An ideal phase shifter has a very small insertion loss, and nearly the same loss at different phase states to achieve amplitude balance. The phase shifter may be of an electrically, optically, magnetically, mechanically controlled type, or the like. A basic function of the phase shifter is to change a transmission phase of a microwave signal by means of controlling a bias voltage. The phase shifter may be classified as a digital phase shifter (whose phase shift amount is discretely adjustable) and an analog phase shifter (whose phase shift amount is continuously adjustable). The digital phase shifter is an important component in a phased array antenna, is used for controlling a phase of each signal in an antenna array, and may enable a radiation beam to perform an electrical scan. The digital phase shifter is also often applied to a digital communication system, as a phase modulator.

SUMMARY

Embodiments of the present disclosure provide a liquid crystal phase shifter, a liquid crystal antenna, a communication apparatus, and a method for operating a liquid crystal phase shifter.

A first aspect of the present disclosure provides a liquid crystal phase shifter, including:

a microwave transmission structure and a phase adjustment structure opposite to each other, and a liquid crystal layer between the microwave transmission structure and the phase adjustment structure; wherein the phase adjustment structure includes a plurality of phase adjustment units;

the plurality of phase adjustment units are configured to change a dielectric constant of the liquid crystal layer according to a voltage applied to the phase adjustment units and a voltage applied to the microwave transmission structure, so as to adjust a phase of a microwave signal; and phase shift amounts adjusted by at least two of the plurality of phase adjustment units are different from each other.

In an embodiment, the microwave transmission structure includes:

a first substrate;
a microstrip at a side of the first substrate proximal to the liquid crystal layer; and
a ground electrode at a side of the first substrate distal to the liquid crystal layer;
wherein the plurality of phase adjustment units are configured to change the dielectric constant of the liquid crystal layer according to the voltage applied to the phase adjustment units and a voltage applied to the microstrip, so as to adjust the phase of the microwave signal.

In an embodiment, the phase adjustment structure includes a second substrate; wherein the plurality of phase adjustment units are at a side of the second substrate proximal to the liquid crystal layer; and each of the plurality of phase adjustment units includes a plurality of electrode strips which are at the side of the second substrate proximal to the liquid crystal layer and have an interval between any adjacent two of the plurality of electrode strips, an orthographic projection of each of the plurality of electrode strips on the first substrate at least partially overlaps an orthographic projection of the microstrip on the first substrate, and numbers of the electrode strips of the plurality of phase adjustment units are different from each other.

In an embodiment, a length direction of each of the plurality of electrode strips and a length direction of the microstrip are perpendicular to each other.

In an embodiment, the microwave transmission structure includes:

a first substrate; and
a coplanar waveguide layer at a side of the first substrate proximal to the liquid crystal layer.

In an embodiment, the coplanar waveguide layer includes:

a central strap at the side of the first substrate proximal to the liquid crystal layer; and
two ground straps at two sides of the central strap, respectively;
wherein the plurality of phase adjustment units are configured to change the dielectric constant of the liquid crystal layer according to the voltage applied to the phase adjustment units and a voltage applied to the central strap, so as to adjust the phase of the microwave signal.

In an embodiment, the phase adjustment structure includes a second substrate; wherein the plurality of phase adjustment units are at a side of the second substrate proximal to the liquid crystal layer; and each of the plurality of phase adjustment units includes a plurality of electrode strips which are at the side of the second substrate proximal to the liquid crystal layer and have an interval between any adjacent two of the plurality of electrode strips, an orthographic projection of each of the plurality of electrode strips on the first substrate at least partially overlaps an orthographic projection of the central strap on the first substrate, and numbers of the electrode strips of the plurality of phase adjustment units are different from each other.

In an embodiment, a length direction of each of the plurality of electrode strips and a length direction of the central strap are perpendicular to each other.

In an embodiment, the liquid crystal phase shifter further includes a plurality of offset lines that have a one-to-one correspondence with the plurality of phase adjustment units and are in a peripheral portion of the side of the second substrate proximal to the liquid crystal layer, and each of the plurality of offset lines is connected to the electrode strips of a corresponding phase adjustment unit.

In an embodiment, the interval between any adjacent two of the plurality of electrode strips is constant.

In an embodiment, a material of each of the plurality of electrode strips includes any one of aluminum, silver, gold, chromium, molybdenum, nickel and iron.

In an embodiment, each of the two ground straps and the central strap are spaced apart from each other, and a length direction of each of the two ground straps and a length direction of the central strap are parallel to each other.

In an embodiment, the plurality of phase adjustment units are connected to each other in series.

In an embodiment, a material of the first substrate includes at least one of glass, ceramic and high-purity quartz glass.

In an embodiment, the liquid crystal layer includes positive liquid crystal molecules, and an angle between a long axis direction of each of the positive liquid crystal molecules and a plane where the first substrate is located is greater than 0 degree and equal to or less than 45 degrees.

In an embodiment, the liquid crystal layer includes negative liquid crystal molecules, and an angle between a long axis direction of each of the negative liquid crystal molecules and a plane where the first substrate is located is greater than 45 degrees and smaller than 90 degrees.

In an embodiment, the liquid crystal phase shifter is a digital phase shifter having a number N of bits equal to a number of the plurality of phase adjustment units, and the digital phase shifter is configured to realize $2^N$ different phase shift amounts.

A second aspect of the present disclosure provides a liquid crystal antenna, including the liquid crystal phase shifter according to any one of the foregoing embodiments of the present disclosure.

A third aspect of the present disclosure provides a communication apparatus, including the liquid crystal antenna according to the foregoing embodiment of the present disclosure.

A fourth aspect of the present disclosure provides a method for operating a liquid crystal phase shifter, wherein the liquid crystal phase shifter is the liquid crystal phase shifter according to any one of the foregoing embodiments of the present disclosure, and the method includes applying a first voltage to the microwave transmission structure;

applying a second voltage different from the first voltage to at least one phase adjustment unit of the plurality of phase adjustment units according to a phase shift amount to generate an electric field between the microwave transmission structure and the at least one phase adjustment unit, such that long axes of liquid crystal molecules of the liquid crystal layer are substantially parallel or substantially perpendicular to a direction of the electric field.

DETAILED DESCRIPTION

To enable one of ordinary skill in the art to better understand the technical solutions of the present disclosure, the present disclosure will be further described in detail below with reference to the accompanying drawings and exemplary embodiments.

Unless otherwise defined, technical terms or scientific terms used in the embodiments and claims of the present disclosure should have the ordinary meanings that are understood by one of ordinary skill in the art to which the present disclosure belongs. The use of words "first," "second," and the like in this disclosure is not intended to indicate any order, quantity, or importance, but rather is used for distinguishing one element from another. The word "comprise," or "include," or the like, means that the element or item preceding the word contains the element or item listed after the word and the equivalents thereof, but does not exclude the presence of other elements or items. The terms "connected," "coupled" and the like are not limited to physical or mechanical connections, but may include electrical connections, whether direct or indirect connections. The words "upper," "lower," "left," "right," and the like are used only for indicating relative positional relationships in the drawings, and when the absolute position of the object being described is changed, these relative positional relationships may also be changed accordingly.

It will be understood that when an element such as a layer, film, region or substrate is referred to as being "on" or "under" another element, it can be "directly on" or "directly under" the other element or intervening elements may be present therebetween.

An embodiment of the present disclosure provides a digital liquid crystal phase shifter, including: a microwave transmission structure and a phase adjustment structure which are disposed opposite to each other, and a liquid crystal layer positioned between the microwave transmission structure and the phase adjustment structure. The phase adjustment structure includes a plurality of phase adjustment units, and the plurality of phase adjustment units may change a dielectric constant of the liquid crystal layer according to a voltage applied to the plurality of phase adjustment units and a voltage applied to the microwave transmission structure, so as to adjust a phase of a microwave signal. Phase shift amounts adjusted by the plurality of phase adjustment units may be different from each other.

Here, it should be noted that the number of phase adjustment units is determined based on the number of bits of the phase shifter, or the number of bits of the phase shifter depends on the number of phase adjustment units. That is, if the number of bits of the phase shifter is N, the number of the phase adjustment units may be determined to be N, and vice versa. In this case, the phase shifter may realize $2^N$ different phase shift amounts (the phase shift amounts may also be referred to as phase states). In an embodiment, the minimum phase shift amount that can be achieved by the phase shifter may be $360°/2^N$.

Since in the liquid crystal phase shifter according to the present embodiment, the phase adjustment structure includes the plurality of phase adjustment units, and an electric field formed after a voltage is applied across the microwave transmission structure and each of the phase adjustment units may drive liquid crystal molecules of the liquid crystal layer to rotate, thereby changing the dielectric constant of the liquid crystal layer. Therefore, a phase of a microwave signal may be changed, and the phase shift amounts adjusted by different phase adjustment units and the microwave transmission structure, after being applied with a voltage across them, are different from each other. That is, each of the phase adjustment units may adjust a corresponding phase shift amount. Therefore, when a phase shift amount is to be adjusted, a voltage may be applied to the corresponding phase adjustment unit according to the magnitude of the phase shift amount to be adjusted, and it is not necessary to apply the voltage to all of the phase adjustment units. As such, the phase shifter according to the present embodiment is easy to control and has low power consumption.

Figure 1:
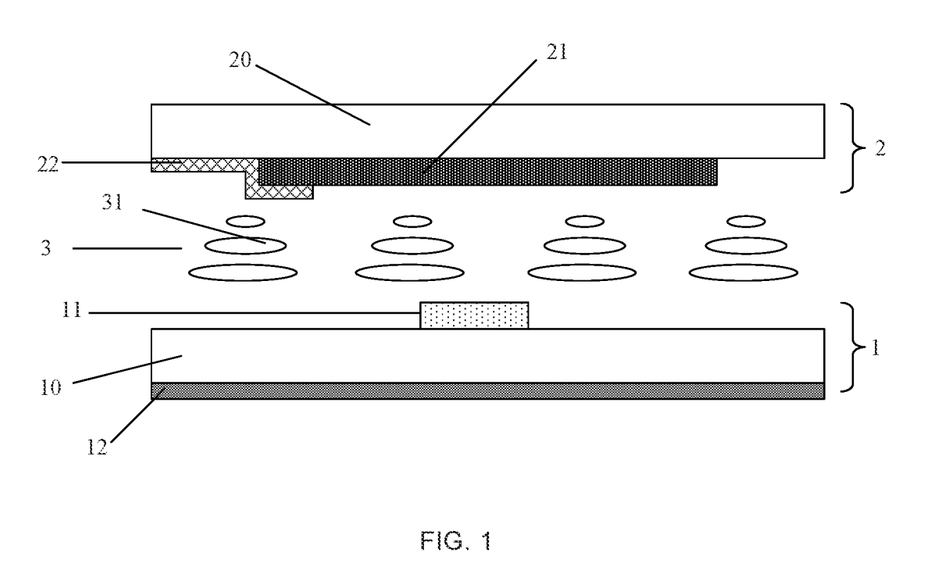
FIG. 1 is a cross-sectional view of a liquid crystal phase shifter according to an embodiment of the present disclosure.
Figure 2:
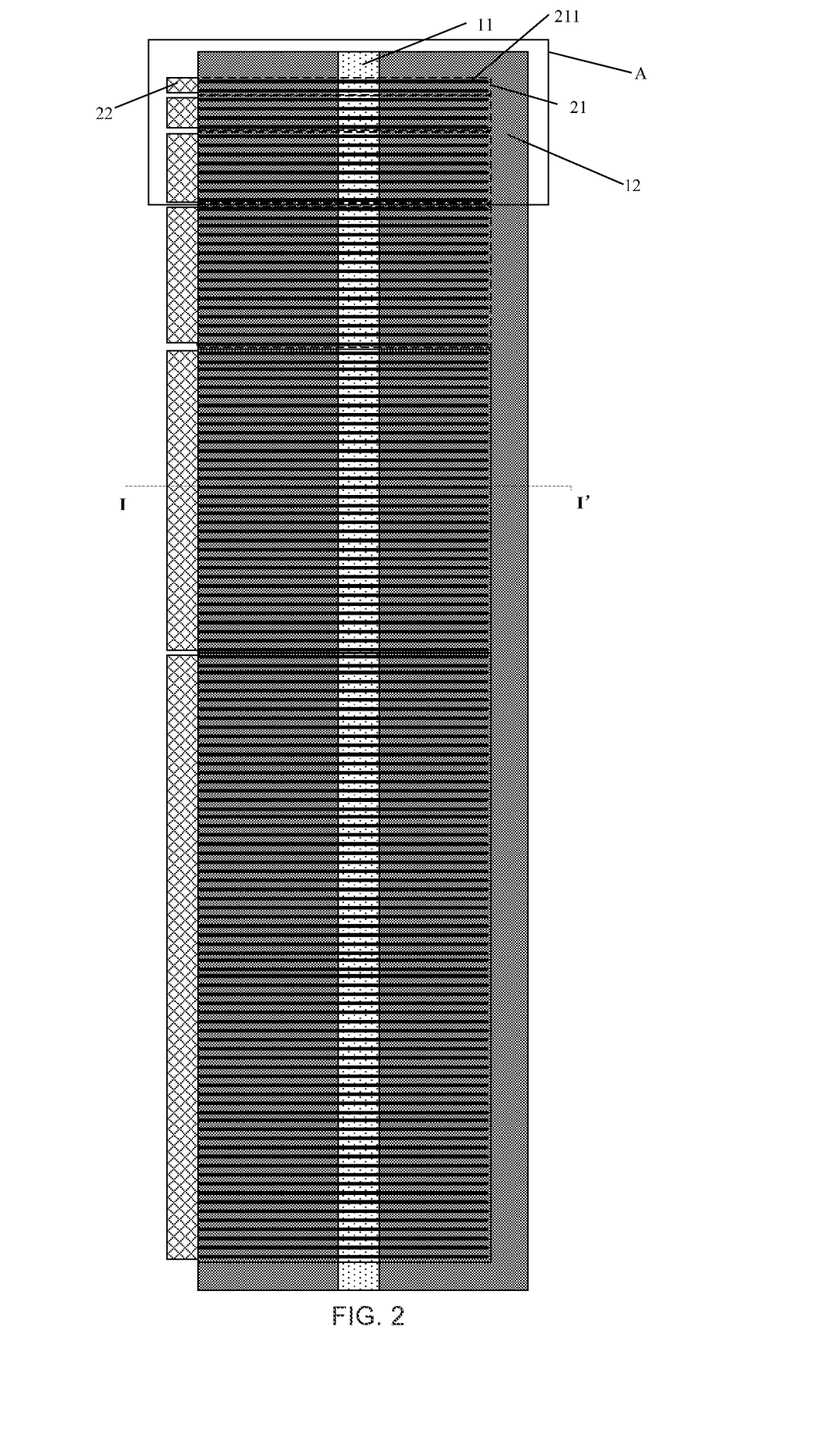
FIG. 2 is a top perspective view of a liquid crystal phase shifter according to an embodiment of the present disclosure.

FIG. 1 is a cross-sectional view of a liquid crystal phase shifter according to an embodiment of the present disclosure, and FIG. 2 is a top perspective view of the liquid crystal phase shifter. For example, FIG. 1 is a cross-sectional view of the liquid crystal phase shifter along line I-I' shown in FIG. 2. As shown in FIG. 1, the present embodiment of the present disclosure provides the digital liquid crystal phase shifter, including: a microwave transmission structure 1 and a phase adjustment structure 2 which are disposed opposite to each other, and a liquid crystal layer 3 positioned between the microwave transmission structure 1 and the phase adjustment structure 2. The microwave transmission structure 1 of the liquid crystal phase shifter includes: a first substrate 10, a microstrip (which may also be referred to as a microstrip line) 11 arranged at a side of the first substrate 10 proximal to the liquid crystal layer 3, and a ground electrode 12 at a side of the first substrate 10 distal to the liquid crystal layer 3. Each of a plurality of phase adjustment units 21 of the phase adjustment structure 2 includes a plurality of electrode strips (which may also referred to as strip electrodes) 211 provided at a side of the second substrate 20 proximal to the liquid crystal layer 3 (see FIGS. 2 and 3), and the numbers of electrode strips 211 of different phase adjustment units 21 may be different from each other. For example, an orthographic projection of the microstrip 11 on one of the substrates and an orthographic projection of each electrode strip 211 on the one of the substrates at least partially overlap each other. In an embodiment, the microstrip 11 may be disposed in the middle portion of the side of the first substrate 10 proximal to the liquid crystal layer 3, and the ground electrode 12 may completely cover the side of the first substrate 10 distal to the liquid crystal layer 3, as shown in FIG. 1. In an embodiment, the plurality of phase adjustment units 21 are connected in series to each other.

For example, in the phase shifter, the microstrip 11 serves as not only a part of the microwave transmission structure 1 but also a part of the phase adjustment structure 2. That is, the microstrip 11 may not only be applied with a voltage but also receive or transmit a microwave signal. For example, in the embodiment shown in FIG. 1, the microstrip 11 and the ground electrode 12 form the microwave transmission structure 1, and in this case, most of microwave signal(s) will be transmitted in the first substrate 10 between the microstrip 11 and the ground electrode 12. In order to effectively reduce the loss of the microwave signal(s), the first substrate 10 may be made of a material such as glass, ceramic, or the like. As such, the microwave signal(s) transmitted in the first substrate 10 are not substantially absorbed, thereby reducing the loss of the microwave signal(s) effectively.

For example, for ease of control and simplicity of wiring, all of the electrode strips 211 of each phase adjustment unit 21 may be controlled by using a same offset line 22.

Figure 3:
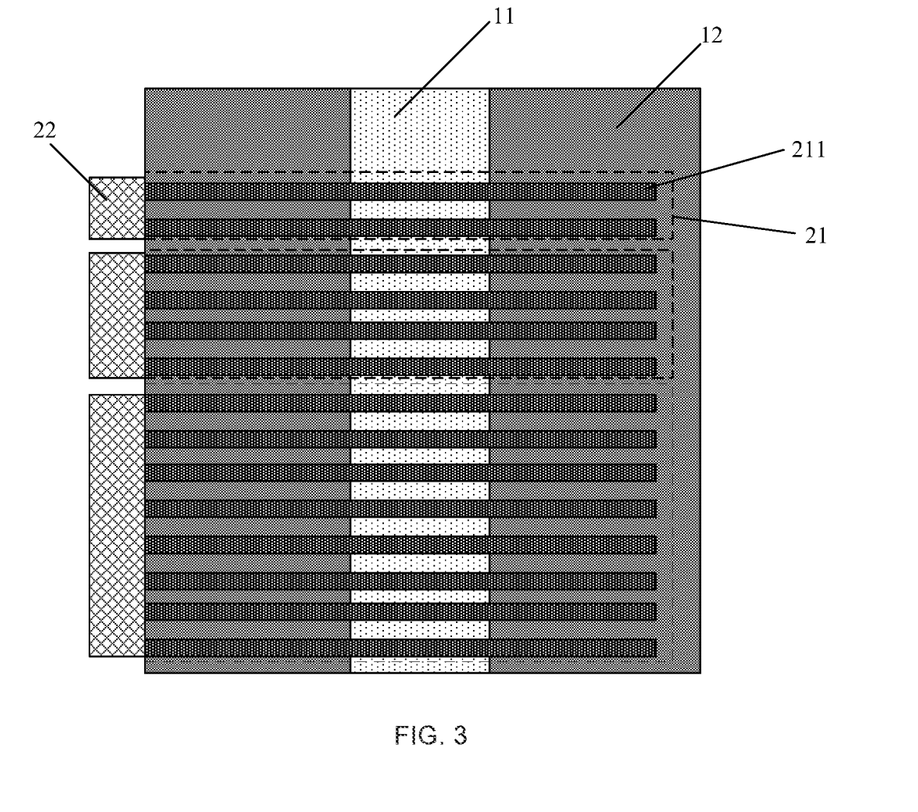
FIG. 3 is an enlarged view of portion A of the liquid crystal phase shifter shown in FIG. 2.

For example, as shown in FIGS. 2 and 3, a six-bit digital liquid crystal phase shifter will be described as an example. The phase shifter has 6 phase adjustment units 21 in total, the numbers of the electrode strips 211 of different phase adjustment units 21 are different from each other, and each of the phase adjustment units 21 is independently controlled by one offset line 22, to achieve phase shifts of 64 different phase values. In FIG. 2, 6 phase adjustment units 21 may have a one-to-one correspondence with 6 offset lines 22. For example, in an embodiment, the 6 phase adjustment units 21 shown in FIG. 2, from top to bottom, may achieve phase shift amounts of 0.9°, 1.5°, 3.1°, 6.1°, 11.5°, and 23.1°, respectively. However, the present disclosure is not limited thereto. For example, the phase shift amount that can be achieved by each phase adjustment unit 21 (or each electrode strip 211) may depend on a material and a size of the phase adjustment unit 21 (or the electrode strip 211), and may be determined through experiments or simulations. For example, in an embodiment, the 6 phase adjustment units 21 shown in FIG. 2, from top to bottom, may be referred to as first to sixth phase adjustment units 21, respectively. The phase shift amount achieved by the first phase adjustment unit 21 may be $360°/2^6=5.625°$, the phase shift amount achieved by the second phase adjustment unit 21 may be 2 times the phase shift amount achieved by the first phase adjustment unit 21, i.e., 5.625°×2=11.25°, the phase shift amount achieved by the third phase adjustment unit 21 may be 2 times the phase shift amount achieved by the second phase adjustment unit 21, i.e., 11.25°×2=22.5°, the phase shift amount achieved by the fourth phase adjustment unit 21 may be 2 times the phase shift amount achieved by the third phase adjustment unit 21, i.e., 22.5°×2=45°, the phase shift amount achieved by the fifth phase adjustment unit 21 may be 2 times the phase shift amount achieved by the fourth phase adjustment unit 21, i.e., 450×2=90°, and the phase shift amount achieved by the sixth phase adjustment unit 21 may be 2 times the phase shift amount achieved by the fifth phase adjustment unit 21, i.e. 90°×2=180°. Alternatively, the phase shift amount that can be achieved by each phase adjustment unit 21 (or each electrode strip 211) may be designed according to a practical application to realize other phase shift amounts.

If a phase shift amount of 0.9° is to be performed on a microwave signal, it is only necessary to apply a second voltage to the offset line 22 connected to the first phase adjustment unit 21 (e.g., the uppermost phase adjustment unit 21 in FIG. 2) corresponding to the phase shift amount such that the offset line 22 outputs the second voltage to the electrode strips 211 connected to the offset line 22, and at the same time, to apply a first voltage different from the second voltage to the microstrip 11. At this time, an electric field is generated between the microstrip 11 and the electrode strips 211 applied with the second voltage to drive liquid crystal molecules 31 of the liquid crystal layer 3 to rotate, thereby changing the dielectric constant of the liquid crystal layer 3, such that the phase of the microwave signal is shifted by 0.9°. If a phase shift amount of 2.4° (=0.9°+1.5°) is to be performed on a microwave signal, the offset lines 22 connected to the first phase adjustment unit 21 and the second phase adjustment unit 21 (e.g., the uppermost phase adjustment unit 21 and the phase adjustment unit 21 adjacent to the uppermost phase adjustment unit 21 in FIG. 2) need to be provided with the second voltage, so as to provide the electrode strips 211 of these two phase adjustment units 21 with the second voltage, and at the same time, the microstrip 11 is provided with the first voltage. At this time, an electric field is generated between the microstrip 11 and the electrode strips 211 applied with the second voltage to drive the liquid crystal molecules 31 of the liquid crystal layer 3 to rotate, thereby changing the dielectric constant of the liquid crystal layer 3, and such that the phase of the microwave signal is shifted by 2.4°. Similarly, if another phase shift amount (e.g., at least one of the above 6 phase shift amounts of 0.9°, 1.5°, 3.1°, 6.1°, 11.5° and 23.1° except the phase shift amounts of 0.9°, 2.4°) is to be achieved, it is necessary to control the single phase adjustment unit 21 that can separately achieve the phase shift amount or the phase adjustment units 21 that can achieve in combination the phase shift amount, to operate in the above-described method to change the phase of the microwave signal.

For example, in the phase shifter, all of the electrode stripes 211 on the second substrate 20 may be arranged periodically. Specifically, intervals (or distances) between every adjacent two of the electrode strips 211 may be set to be identical (i.e., constant). Alternatively, the electrode strips 211 may be arranged such that the distances between every adjacent two of the electrode strips 211 are distributed according to a predetermined rule. Such configurations facilitate control of the electrode strips 211.

For example, a length direction (e.g., the horizontal direction in FIG. 2) of each of the electrode strips 211 and a length direction (e.g., the vertical direction in FIG. 2) of the microstrip 11 are perpendicular to each other. Here, it should be noted that the length direction of each electrode strip 211 and the length direction of the microstrip 11 both refer to long axis directions thereof, respectively. Such an arrangement is advantageous in that, an overlapping area of each electrode strip 211 and the microstrip 11 may be large enough, and when a voltage is applied to the electrode strips 211 of each phase adjustment unit 21, an electric field formed between the electrode strips 211 of the phase adjustment unit 21 and the microstrip 11 is large enough to drive the liquid crystal molecules 31 between the electrode strips 211 of the phase adjustment unit 21 and the microstrip 11 to rotate. In this way, the dielectric constant of the liquid crystal layer 3 is changed to realize the desired amount of phase shift.

For example, each of the first substrate 10 and the second substrate 20 may be a glass substrate having a thickness of 100 μm to 1000 μm, or a sapphire substrate, or may be a polyethylene terephthalate substrate, a triallyl cyanurate substrate, or a transparent flexible polyimide substrate, which has a thickness of 10 μm to 500 μm. For example, each of the first substrate 10 and the second substrate 20 may be made of high-purity quartz glass having extremely low dielectric loss. Compared with a general glass substrate, the first substrate 10 and the second substrate 20 made of high-purity quartz glass may effectively reduce loss of a microwave, and make the phase shifter have low power consumption and a high signal-to-noise ratio. For example, the high-purity quartz glass may refer to quartz glass in which the weight percentage of $SiO_2$ is 99.9% or more.

For example, each of the microstrip 11, the ground electrode 12 and each electrode strip 211 may be made of a metal such as aluminum, silver, gold, chromium, molybdenum, nickel, iron, or the like. Alternatively, the microstrip 11 may be made of a transparent conductive oxide.

For example, the liquid crystal molecules 31 of the liquid crystal layer 3 may be positive liquid crystal molecules or negative liquid crystal molecules. It should be noted that, in a case where the liquid crystal molecules 31 are positive liquid crystal molecules, an angle between a long axis direction of each liquid crystal molecule 31 and a plane where the first substrate 10 is located is greater than 0 degree and equal to or less than 45 degrees. In a case where the liquid crystal molecules 31 are negative liquid crystal molecules, an angle between a long axis direction of each liquid crystal molecule 31 and a plane where the first substrate 10 is located is greater than 45 degrees and smaller than 90 degrees. As such, it is guaranteed that the dielectric constant of the liquid crystal layer 3 will be changed after the liquid crystal molecules 31 are driven to rotate, thereby achieving the purpose of phase shifting.

In the liquid crystal phase shifter according to the present embodiment, the phase adjustment structure 2 includes the plurality of phase adjustment units 21, and an electric field formed between each of the phase adjustment units 21 and the microstrip 11 after being applied with different voltages, respectively, drives the liquid crystal molecules 31 of the liquid crystal layer 3 to rotate, thereby changing the dielectric constant of the liquid crystal layer 3. Therefore, a phase of a microwave signal may be changed, and the microstrip 11 and the electrode strips 211 of different phase adjustment units 21, after being provided with different voltages, respectively, achieve phase shift amounts different from each other. That is, each of the phase adjustment units 21 may achieve a corresponding phase shift amount. As such, when a phase shift amount is to be achieved, a voltage may be applied to a corresponding phase adjustment unit 21 according to the magnitude of the phase shift amount to be achieved, and it is not necessary to apply the voltage to all of the phase adjustment units 21. As a result, the phase shifter according to the present embodiment is easy to control and has low power consumption. Further, since the microwave transmission structure 1 is formed by the microstrip 11 and the ground electrode 12, in this case, most of microwave signal(s) will be transmitted in the first substrate 10 between the microstrip 11 and the ground electrode 12. In addition, the first substrate 10 may be made of glass, ceramic or high-purity quartz glass, and the microwave signal(s) transmitted in the first substrate 10 are not substantially absorbed, thereby reducing the loss of the microwave signal(s) effectively.

Figure 4:
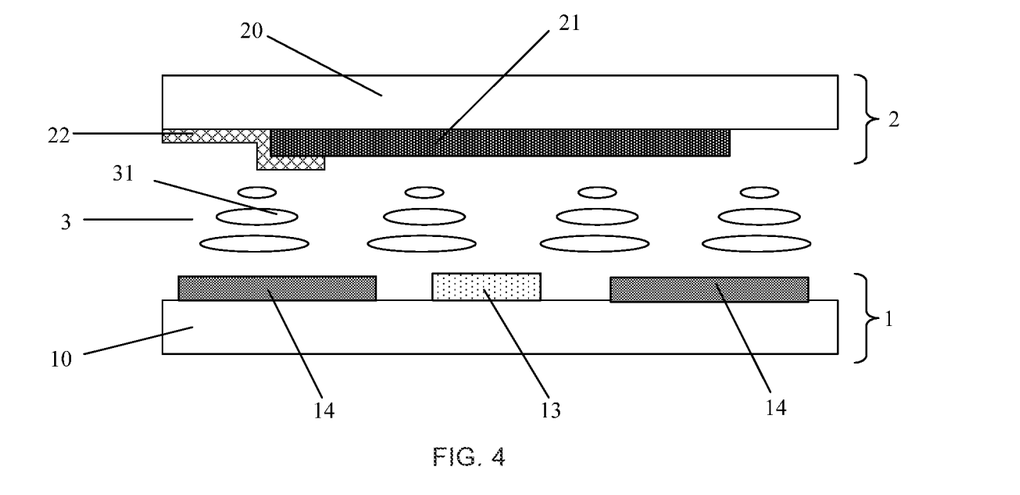
FIG. 4 is a cross-sectional view of a liquid crystal phase shifter according to an embodiment of the present disclosure.
Figure 5:
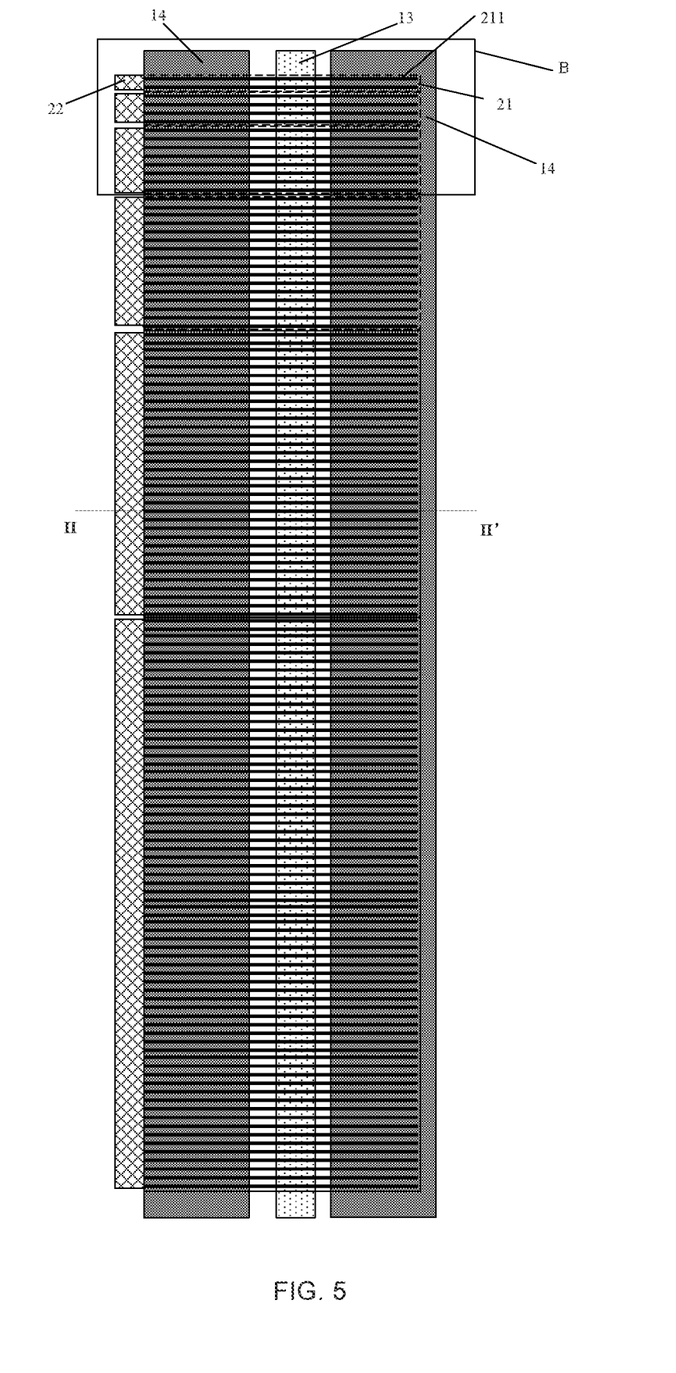
FIG. 5 is a top perspective view of a liquid crystal phase shifter according to an embodiment of the present disclosure.
Figure 6:
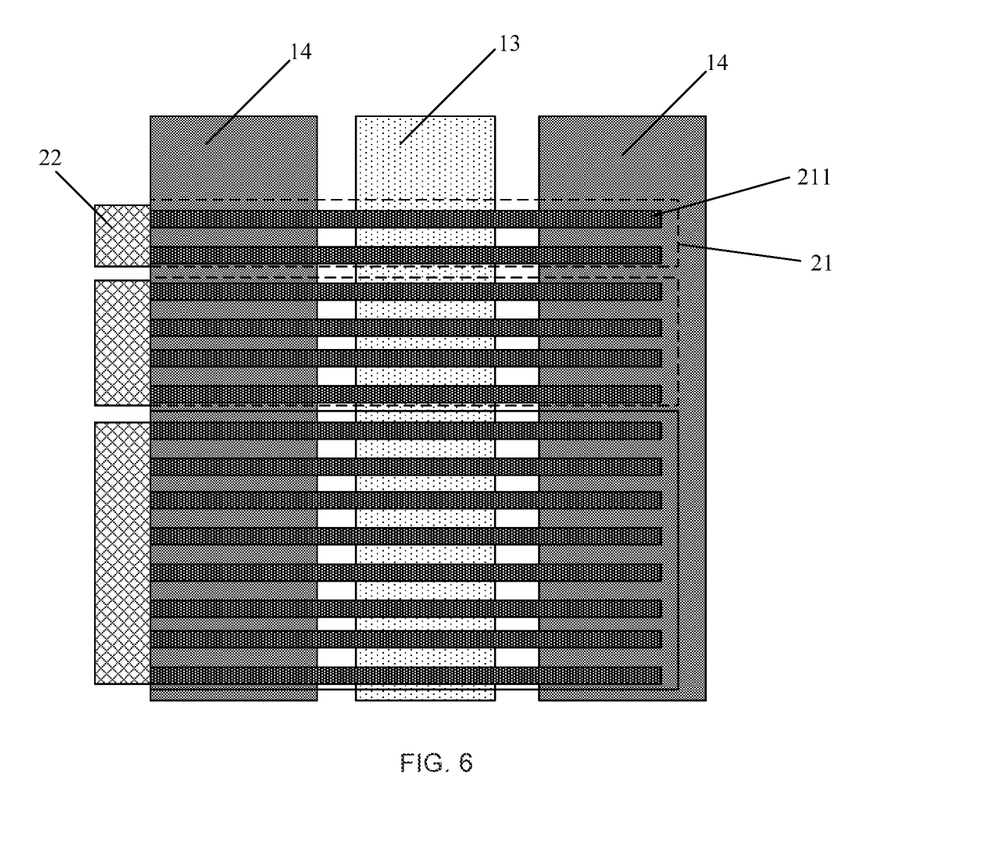
FIG. 6 is an enlarged view of portion B of the liquid crystal phase shifter shown in FIG. 5.

FIG. 4 is a cross-sectional view of a liquid crystal phase shifter according to another embodiment of the present disclosure, and FIG. 5 is a top perspective view of the liquid crystal phase shifter. For example, FIG. 4 is a cross-sectional view of the liquid crystal phase shifter along line II-II' shown in FIG. 5. As shown in FIG. 4, the present embodiment provides another digital liquid crystal phase shifter, including: a microwave transmission structure 1 and a phase adjustment structure 2 that are arranged opposite to each other, and a liquid crystal layer 3 positioned between the microwave transmission structure 1 and the phase adjustment structure 2. The microwave transmission structure 1 of the phase shifter includes a first substrate 10 and a coplanar waveguide layer at a side of the first substrate 10 proximal to the liquid crystal layer 3. For example, the coplanar waveguide layer may include: a central strap (which may also be referred to as a central strip) 13 on the first substrate 10, for example, in a central portion of a side of the first substrate 10 proximal to the liquid crystal layer 3; two ground straps (which may also be referred to as ground strips) 14 arranged at two sides of the central strap 13, respectively. In an embodiment, each of the two ground straps 14 and the central strap are spaced apart from each other, and a length direction of each of the two ground straps 14 and a length direction of the central strap 13 are parallel to each other, as shown in FIGS. 5 and 6. In an embodiment, the central strap 13 may be the same as the microstrip 11 according to the foregoing embodiment. The phase adjustment structure 2 includes a second substrate 20 and a plurality of phase adjustment units 21 located on a side of the second substrate 20 proximal to the liquid crystal layer 3. For example, each of the phase adjustment units 21 includes a plurality of electrode strips 211 disposed at the side of the second substrate 20 proximal to the liquid crystal layer 3 with at interval between any adjacent two of the plurality of electrode strips 211. An orthographic projection of each of the electrode strips 211 on the first substrate 10 at least partially overlaps an orthographic projection of the central strap 13 on the first substrate 10, and the numbers of the electrode strips 211 of the plurality of phase adjustment units 21 are different from each other. For example, the plurality of phase adjustment units 21 may be connected in series to each other.

For example, in this phase shifter, a microwave signal may be transmitted in a region between the central strap 13 and each ground strap 14 of the coplanar waveguide layer. In a case where the coplanar waveguide layer is applied to the phase shifter, a thickness of the liquid crystal layer 3 is designed to be relatively thin, for example, to be approximately 4 μm to 5 μm, such that the microwave signal will be transmitted in the liquid crystal layer 3, but the loss of the microwave signal is relatively low.

For example, for ease of control and simplicity of wiring, the electrode strips 211 of each phase adjustment unit 21 may be controlled by using a same offset line 22.

For example, as shown in FIGS. 5 and 6, taking a six-bit digital liquid crystal phase shifter as an example, the phase shifter has 6 phase adjustment units 21 in total, the numbers of electrode strips 211 of different phase adjustment units 21 are different from each other, and each of the phase adjustment units 21 is independently controlled by one offset line 22, to achieve phase shifts of 64 different phase values. In FIG. 5, the 6 phase adjustment units 21 may have a one-to-one correspondence with the 6 offset lines 22. For example, in an embodiment, the 6 phase adjustment units 21 shown in FIG. 5, from top to bottom, may achieve phase shift amounts of 0.9°, 1.5°, 3.1°, 6.1°, 11.5°, and 23.1°, respectively.

If a phase shift amount of 0.9° is to be performed on a microwave signal, it is only necessary to apply a second voltage to the offset line 22 connected to the first phase adjustment unit 21 (e.g., the uppermost phase adjustment unit 21 in FIG. 5) corresponding to the phase shift amount, to make the offset line 22 output the second voltage to the electrode strips 211 connected to the offset line 22, and at the same time, apply a first voltage different from the second voltage to the central strap 13. At this time, an electric field is generated between the central strap 13 and the electrode stripes 211 to which the second voltage is applied to drive the liquid crystal molecules 31 of the liquid crystal layer 3 to rotate, thereby changing the dielectric constant of the liquid crystal layer 3, such that a phase of the microwave signal is shifted by 0.9°. If a phase shift amount of 2.4° (=0.9°+1.5°) is to be performed on the microwave signal, the offset lines 22 connected to the first phase adjustment unit 21 and the second phase adjustment unit 21 (e.g., the uppermost phase adjustment unit 21 and the phase adjustment unit 21 adjacent to the uppermost phase adjustment unit 21 in FIG. 5) need to be provided with the second voltage, so as to provide the electrode strips 211 of these two phase adjustment units 21 with the second voltage, and at the same time the central strap 13 is provided with the first voltage different from the second voltage. At this time, an electric field is generated between the central strap 13 and the electrode stripes 211 provided with the second voltage to drive the liquid crystal molecules 31 of the liquid crystal layer 3 to rotate, thereby changing the dielectric constant of the liquid crystal layer 3, such that the phase of the microwave signal is shifted by 2.4°. Similarly, if another phase shift amount (e.g., at least one of the above 6 phase shift amounts of 0.9°, 1.5°, 3.1°, 6.1°, 11.5° and 23.1° except the phase shift amounts of 0.90 and 2.4°) is to be achieved, it is necessary to control the single phase adjustment unit 21 that can separately achieve the phase shift amount or the phase adjustment units 21 that can achieve in combination the phase shift amount, to operate in the above-described method to change the phase of the microwave signal.

For example, in this phase shifter, all of the electrode stripes 211 on the second substrate 20 may be arranged periodically. Specifically, the intervals (or distances) between every adjacent two of the electrode strips 211 may be set to be identical (i.e., constant). Alternatively, the electrode strips 211 may also be arranged in such a way that the distances between every adjacent two of the electrode strips 211 are distributed according to a predetermined rule. Such configurations facilitate control of the electrode strips 211.

For example, a length direction (e.g., the horizontal direction in FIG. 5) of each electrode strip 211 and a length direction (e.g., the vertical direction in FIG. 5) of the central strap 13 are perpendicular to each other. It should be noted that the length direction of each electrode strip 211 and the length direction of the central strap 13 are both referred to long axis directions of each electrode strip 211 and the central strap 13, respectively. Such an arrangement may make an overlapping area of each electrode strip 211 and the central strap 13 be large enough, such that when a voltage is applied to the electrode strips 211 of each phase adjustment unit 21, the electric field formed between each of the electrode strips 211 of the phase adjustment unit 21 and the central strap 13 is large enough to drive the liquid crystal molecules 31 to rotate, thereby changing the dielectric constant of the liquid crystal layer 3 to achieve the desired amount of phase shift.

For example, each of the first substrate 10 and the second substrate 20 may be a glass substrate having a thickness of 100 μm to 1000 μm, or a sapphire substrate, or may be a polyethylene terephthalate substrate, a triallyl cyanurate substrate, or a transparent flexible polyimide substrate, which has a thickness of 10 μm to 500 μm. For example, each of the first substrate 10 and the second substrate 20 may be made of high-purity quartz glass having extremely low dielectric loss. Compared with a general glass substrate, the first substrate 10 and the second substrate 20 made of high-purity quartz glass may effectively reduce loss of a microwave signal, and ensure that the phase shifter has low power consumption and a high signal-to-noise ratio.

For example, each of the central strap 13, each ground strap 14 and each electrode strip 211 may be made of a metal such as aluminum, silver, gold, chromium, molybdenum, nickel, iron, or the like.

For example, the liquid crystal molecules 31 of the liquid crystal layer 3 may be positive liquid crystal molecules or negative liquid crystal molecules. It should be noted that in a case where the liquid crystal molecules 31 are positive liquid crystal molecules, an angle between a long axis direction of each liquid crystal molecule 31 and a plane where the first substrate 10 is located is greater than 0 degree and equal to or less than 45 degrees. In a case where the liquid crystal molecules 31 are negative liquid crystal molecules 31, an angle between a long axis direction of each liquid crystal molecule 31 and the plane where the first substrate 10 is located is greater than 45 degrees and smaller than 90 degrees. As such, it is guaranteed that the dielectric constant of the liquid crystal layer 3 will be changed after the liquid crystal molecules 31 are driven to rotate, thereby achieving the purpose of phase shifting.

Other aspects of the phase shifter according to the present embodiment may be the same as those of the phase shifter according to the embodiment corresponding to FIGS. 1 to 3, and detailed description thereof is omitted here.

In the liquid crystal phase shifter according to the present embodiment, the phase adjustment structure 2 includes the plurality of phase adjustment units 21, and an electric field formed between each of the phase adjustment units 21 and the central strap 13, after being provided with different voltages, respectively, drives the liquid crystal molecules 31 of the liquid crystal layer 3 to rotate, thereby changing the dielectric constant of the liquid crystal layer 3. Therefore, a phase of a microwave signal may be adjusted, and the phase shift amounts adjusted by the central strap 13 and the electrode strips 211 of different phase adjustment units 21, after being provided with different voltages, respectively, are different from each other. That is, each of the phase adjustment units 21 may adjust a corresponding phase shift amount. Thus, when a phase shift amount is to be adjusted, a voltage may be applied to corresponding phase adjustment unit(s) 21 according to the magnitude of the phase shift amount to be adjusted, and it is not necessary to apply the voltage to all of the phase adjustment units 21. As a result, the phase shifter according to the present embodiment is easy to control, and has low power consumption.

The present embodiment provides a liquid crystal antenna including the liquid crystal phase shifter according to any one of the above-described embodiments. For example, at least two patch units (not shown in the figures) may be further disposed at a side of the second substrate 20 distal to the liquid crystal layer 3, for example, an interval between any adjacent two of the patch units corresponds to the interval between any adjacent two of the electrode strips. In this way, the microwave signal(s) phase-adjusted by the phase shifter according to any one of the above embodiments may be radiated outwards through the interval between any adjacent two of the patch units.

In addition, the liquid crystal antenna may further include a feed interface (not shown in the figures), and the feed interface may feed a microwave signal from a cable to the microwave transmission structure 1 (e.g., the microstrip 11 shown in FIG. 1 or the central strap 13 shown in FIG. 4).

The liquid crystal antenna according to the present embodiment includes the liquid crystal phase shifter according to any one of the above-described embodiments of the present disclosure, the phase adjustment structure in the liquid crystal phase shifter includes the plurality of phase adjustment units, and an electric field formed between the microwave transmission structure and each of the phase adjustment units, after being provided with different voltages, respectively, drives liquid crystal molecules of the liquid crystal layer to rotate, thereby changing the dielectric constant of the liquid crystal layer. Therefore, a phase of a microwave signal may be changed, and the phase shift amounts adjusted by the microwave transmission structure and different phase adjustment units, after being provided with different voltages, respectively, are different from each other. That is, each of the phase adjustment units may adjust a corresponding phase shift amount. As such, when a phase shift amount is to be adjusted, a voltage may be applied to corresponding phase adjustment unit(s) according to the magnitude of the phase shift amount to be adjusted, without applying the voltage to all of the phase adjustment units. As a result, the liquid crystal antenna according to the present embodiment is easy to control, and has low power consumption.

An embodiment of the present disclosure provides a communication apparatus that may include the liquid crystal antenna according to the above-described embodiment of the present disclosure. The communication apparatus may have low power consumption.

An embodiment of the present disclosure provides a method for operating a liquid crystal phase shifter. The liquid crystal phase shifter may be the liquid crystal phase shifter according to any one of the embodiments shown in FIGS. 1 to 6, and the method may include: applying a first voltage to the microwave transmission structure 1 (e.g., the microstrip 11 shown in FIG. 1 or the central strap 13 shown in FIG. 4); and applying a second voltage different from the first voltage to at least one phase adjustment unit 21 of the plurality of phase adjustment units 21 according to a desired phase shift amount, to generate an electric field between the microwave transmission structure 1 and the at least one phase adjustment unit 21 such that the long axes of the liquid crystal molecules 31 of the liquid crystal layer 3 are substantially parallel (for the case of positive liquid crystal molecules) or substantially perpendicular (for the case of negative liquid crystal molecules) to a direction of the electric field.

It should be understood that the above embodiments are merely exemplary embodiments for explaining the principle of the present disclosure, and the present disclosure is not limited thereto. It will be apparent to one of ordinary skill in the art that various changes and modifications may be made therein without departing from the spirit and essence of the present disclosure, and these changes and modifications also fall within the scope of the present disclosure.

What is claimed is:

1. A liquid crystal phase shifter, comprising:
   a microwave transmission structure and a phase adjustment structure opposite to each other, and a liquid crystal layer between the microwave transmission structure and the phase adjustment structure; wherein
   the phase adjustment structure comprises a plurality of phase adjustment units;
   the plurality of phase adjustment units are configured to change a dielectric constant of the liquid crystal layer according to a voltage applied to the phase adjustment units and a voltage applied to the microwave transmission structure, so as to adjust a phase of a microwave signal; and
   phase shift amounts adjusted by at least two of the plurality of phase adjustment units are different from each other, wherein
   the microwave transmission structure comprises: a first substrate; a microstrip at a side of the first substrate proximal to the liquid crystal layer; and a ground electrode at a side of the first substrate distal to the liquid crystal layer;
   the plurality of phase adjustment units are connected to each other in series; and
   the microstrip has a straight-line shape that extends in a direction in which the plurality of phase adjustment units are connected to each other in series, and has a one-piece structure in the direction.

2. The liquid crystal phase shifter according to claim 1, wherein:

the plurality of phase adjustment units are configured to change the dielectric constant of the liquid crystal layer according to the voltage applied to the phase adjustment units and a voltage applied to the microstrip, so as to adjust the phase of the microwave signal.

3. The liquid crystal phase shifter according to claim 2, wherein the phase adjustment structure comprises a second substrate; wherein
the plurality of phase adjustment units are at a side of the second substrate proximal to the liquid crystal layer; and
each of the plurality of phase adjustment units comprises a plurality of electrode strips which are at the side of the second substrate proximal to the liquid crystal layer and have an interval between any adjacent two of the plurality of electrode strips, an orthographic projection of each of the plurality of electrode strips on the first substrate at least partially overlaps an orthographic projection of the microstrip on the first substrate, and numbers of the electrode strips of the plurality of phase adjustment units are different from each other.

4. The liquid crystal phase shifter according to claim 3, wherein a length direction of each of the plurality of electrode strips and a length direction of the microstrip are perpendicular to each other.

5. The liquid crystal phase shifter according to claim 3, further comprising a plurality of offset lines that have a one-to-one correspondence with the plurality of phase adjustment units and are in a peripheral portion of the side of the second substrate proximal to the liquid crystal layer, and each of the plurality of offset lines is connected to the electrode strips of a corresponding phase adjustment unit.

6. The liquid crystal phase shifter according to claim 3, wherein the interval between any adjacent two of the plurality of electrode strips is constant.

7. The liquid crystal phase shifter according to claim 3, wherein a material of each of the plurality of electrode strips comprises any one of aluminum, silver, gold, chromium, molybdenum, nickel and iron.

8. The liquid crystal phase shifter according to claim 1, wherein a material of the first substrate comprises at least one of glass, ceramic and high-purity quartz glass.

9. The liquid crystal phase shifter according to claim 1, wherein the liquid crystal layer comprises positive liquid crystal molecules, and an angle between a long axis direction of each of the positive liquid crystal molecules and a plane where the first substrate is located is greater than 0 degree and equal to or less than 45 degrees; or
wherein the liquid crystal layer comprises negative liquid crystal molecules, and an angle between a long axis direction of each of the negative liquid crystal molecules and a plane where the first substrate is located is greater than 45 degrees and smaller than 90 degrees.

10. The liquid crystal phase shifter according to claim 1, wherein the liquid crystal phase shifter is a digital phase shifter having a number N of bits equal to a number of the plurality of phase adjustment units, and the digital phase shifter is configured to realize $2^N$ different phase shift amounts.

11. A liquid crystal antenna, comprising the liquid crystal phase shifter according to claim 1.

12. A communication apparatus, comprising the liquid crystal antenna according to claim 11.

13. A method for operating a liquid crystal phase shifter, wherein the liquid crystal phase shifter is the liquid crystal phase shifter according to claim 1, and the method comprises applying a first voltage to the microwave transmission structure;
applying a second voltage different from the first voltage to at least one phase adjustment unit of the plurality of phase adjustment units according to a phase shift amount, to generate an electric field between the microwave transmission structure and the at least one phase adjustment unit, such that long axes of liquid crystal molecules of the liquid crystal layer are substantially parallel or substantially perpendicular to a direction of the electric field.

14. A liquid crystal phase shifter, comprising:
a microwave transmission structure and a phase adjustment structure opposite to each other, and a liquid crystal layer between the microwave transmission structure and the phase adjustment structure; wherein
the phase adjustment structure comprises a plurality of phase adjustment units;
the plurality of phase adjustment units are configured to change a dielectric constant of the liquid crystal layer according to a voltage applied to the phase adjustment units and a voltage applied to the microwave transmission structure, so as to adjust a phase of a microwave signal; and
phase shift amounts adjusted by at least two of the plurality of phase adjustment units are different from each other, wherein the microwave transmission structure comprises:
a first substrate; and
a coplanar waveguide layer at a side of the first substrate proximal to the liquid crystal layer;
wherein the coplanar waveguide layer comprises a central strap at the side of the first substrate proximal to the liquid crystal layer;
the plurality of phase adjustment units are connected to each other in series; and
the central strap has a straight-line shape that extends in a direction in which the plurality of phase adjustment units are connected to each other in series, and has a one-piece structure in the direction.

15. The liquid crystal phase shifter according to claim 14, wherein the coplanar waveguide layer further comprises:
two ground straps at two sides of the central strap, respectively;
wherein the plurality of phase adjustment units are configured to change the dielectric constant of the liquid crystal layer according to the voltage applied to the phase adjustment units and a voltage applied to the central strap, so as to adjust the phase of the microwave signal; and
wherein each of the two ground straps and the central strap are spaced apart from each other, and a length direction of each of the two ground straps and a length direction of the central strap are parallel to each other.

16. The liquid crystal phase shifter according to claim 15, wherein the phase adjustment structure comprises a second substrate; wherein
the plurality of phase adjustment units are at a side of the second substrate proximal to the liquid crystal layer; and
each of the plurality of phase adjustment units comprises a plurality of electrode strips which are at the side of the second substrate proximal to the liquid crystal layer and have an interval between any adjacent two of the plurality of electrode strips, an orthographic projection of each of the plurality of electrode strips on the first substrate at least partially overlaps an orthographic projection of the central strap on the first substrate, and numbers of the electrode strips of the plurality of phase adjustment units are different from each other.

17. The liquid crystal phase shifter according to claim 16, wherein a length direction of each of the plurality of electrode strips and a length direction of the central strap are perpendicular to each other.

18. The liquid crystal phase shifter according to claim 16, further comprising a plurality of offset lines that have a one-to-one correspondence with the plurality of phase adjustment units and are in a peripheral portion of the side of the second substrate proximal to the liquid crystal layer, and each of the plurality of offset lines is connected to the electrode strips of a corresponding phase adjustment unit.

19. The liquid crystal phase shifter according to claim 16, wherein the interval between any adjacent two of the plurality of electrode strips is constant.

20. The liquid crystal phase shifter according to claim 16, wherein a material of each of the plurality of electrode strips comprises any one of aluminum, silver, gold, chromium, molybdenum, nickel and iron.

* * * * *